Feb. 9, 1960     H. ZIMMERMAN     2,924,187
SUBSOIL APPLICATOR
Filed May 12, 1958
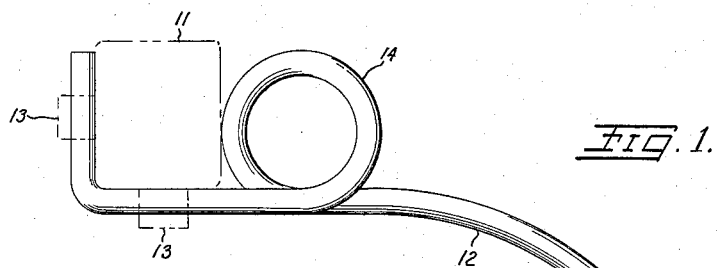
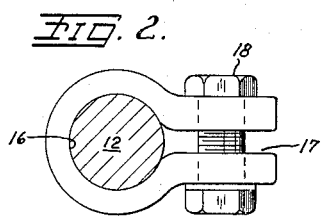
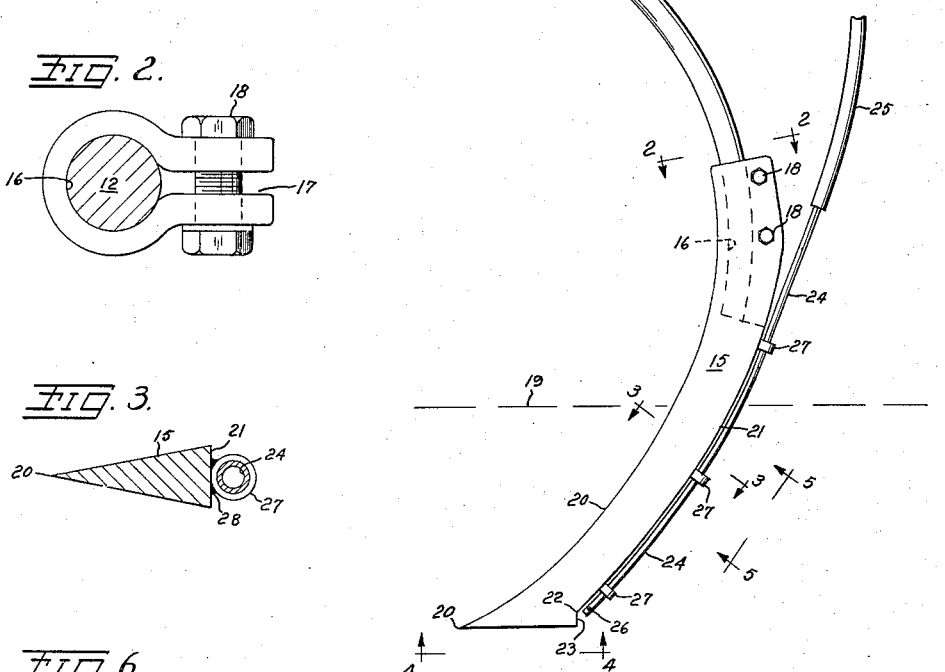
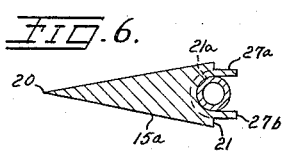
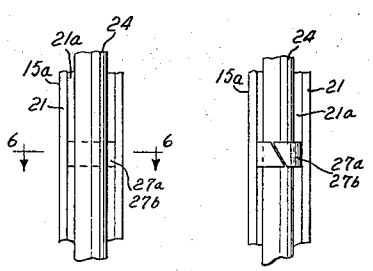
INVENTOR
Henry Zimmerman.
BY
AGENT

United States Patent Office 2,924,187
Patented Feb. 9, 1960

2,924,187

SUBSOIL APPLICATOR

Henry Zimmerman, Portland, Oreg., assignor to Zimmerman's Spring Works, Inc., a corporation of Oregon Application May 12, 1958, Serial No. 734,463

2 Claims. (Cl. 111—7)

This invention relates generally to agricultural implements and more particularly to the combination of a subsoil applicator for anhydrous ammonia and an improved digger attachment for a spring element of a spring tooth type of soil cultivator.

It is the primary object of this invention to provide, for the free end of the spring element of a cultivator spring tooth, a blade or digger attachment which can be readily secured to the curved cylindrical end of the spring element without any special preparation of the spring element to accommodate the attachment.

It is a second object to provide such a digger attachment of generally triangular section throughout its soil contacting length and of generally hollow circular section along its attachment length.

It is a third object to provide such a blade or digger attachment which has a relatively sharp edge along the forward concave length of its soil contacting end.

It is a fourth object to provide such a digger attachment formed with a longitudinal slot along the convex longitudinal rear side of its attachment length and having means for clamping the sides of said slot together to secure the digger attachment to the spring element.

It is a fifth object to provide such a digger attachment with means for securing a conduit for anhydrous ammonia along the longitudinal rear edge thereof and means for spacing said conduit from said attachment to prevent overcooling of the conduit by the anhydrous ammonia as is expands and cools on emission under pressure from a pair of lateral holes in the soil end of the conduit.

How these and other objects are attained will be understood from the following explanation referring to the attached drawing in which Fig. 1 is a part sectional view in side elevation of a combination spring element and digger attachment of this invention with one end of the spring element indicated as attached to a section of a common rocking and supporting bar for all of the teeth of a cultivator.

Fig. 2 is a sectional view from the line 2, 2, of Fig. 1.

Fig. 3 is a sectional view from the line 3, 3, of Fig. 1.

Fig. 4 is a bottom plan view as would be seen from the line 4—4 of Fig. 1.

Fig. 5 is a fragmental view in rear elevation from a position like 5, 5 of Fig. 1 of a form of digger attachment having a different means for securing the gas conduit to the digger attachment.

Fig. 6 is a sectional view as seen along the line 6—6 of Fig. 5.

Fig. 7 is a view similar to Fig. 5 but with the gas conduit secured to the digger attachment.

Like reference numerals refer to the like parts in the several figures of the drawing.

Referring now to the drawing there is shown in Fig. 1 by the broken line 11 the substantially square cross section of a rockable transverse tool bar of a wheeled cultivator. A plurality of spring elements 12 are laterally spaced and secured to bar 11 by clamps 13 as indicated in Fig. 1. Near its end clamped to bar 11 spring element 12 is seen to have its flexibility increased by the added spring length contributed by complete loop 14. From its loop 14 to its free end spring element 12 is seen to be formed arcuately concavely forwardly in the direction of motion of the cultivator, which is to the left as seen in Fig. 1.

Digger attachment 15, as shown in Figs. 1 and 2, is formed at its upper generally circular end with a cylindrical socket 16 formed snugly and coaxially to receive the curved free end of spring element 12. The back wall of socket 16 is seen to be longitudinally split at 17 and formed to receive bolts 18 with which spring element 12 is securely clamped in socket 16. It is particularly to be noted that by forming the free end of spring element 12 and the interior of socket 16 of digger 15 with the same mating diameter and with the same longitudinally curved axis, digger 15 is easily secured by bolts 18 to spring element 12 and can not be rotated about element 12 as an axle.

To insure the least possible power requirement to drag the digger 15 through the soil to an average depth shown by the dashed ground line 19 and thus cause the least wear on the surface of heat treated chrome molybdenum high carbon steel digger 15, digger 15 below its socket 16 is formed with a relatively sharp concavely longitudinally curved front edge 20 and a generally acute triangular cross section as shown in Figs. 1 and 3. The bottom end of digger 15 is also triangular in shape as shown in Fig. 4 and is formed to be substantially parallel to the ground surface 19, but since spring element 12 flexes somewhat as digger 15 is dragged through the ground the flat end surface of digger 15 will point forwardly downwardly into the ground somewhat when in use.

The rear surface 21 of digger 15 below the socket 16 is generally flat but rearwardly convexly bowed down to a position 22 where it drops substantially vertically to the rear side of the triangular bottom end of digger 15, the offset 23 thus formed being sufficient to give the desired mechanical protection to metal conduit 24 required to conduct liquid ammonia under pressure from a storage tank (not shown) carried on the frame of the wheeled cultivator (not shown) of which the tool bar 11 of Fig. 1 is a part. Flexible hose 25 connects conduit 24 with the storage tank. As shown in Figs. 1 and 4 the lower end of conduit 24 is closed except for the two laterally opposed holes 26 from which the vaporized ammonia is ejected into the surrounding soil.

As shown in Figs. 1 and 3 conduit 24 is secured to and spaced from the rear face 21 of digger 15 by bendable metal strips 27 secured by welding at their mid lengths to digger 15 and then bent tightly around conduit 24.

It has been found from experience in feeding nitrogen fertilizer to the soil in the form of ammonia as here shown that, from the presence of water in the ammonia or from some other cause, if the conduit 24 becomes too low in temperature it will sometimes become difficult to pass the ammonia through the conduit. For this reason conduit 24 is here shown to be spaced from digger 15 by strips 27 to prevent digger 15, cooled by the absorption of heat by gas emitted from holes 26, from absorbing heat from conduit 24 in an amount effective to at least partially clog conduit 24.

Figs. 5, 6 and 7 show a slightly different form of digger 15 in which the equivalent of the strips 27 are cast as part of digger 15 instead of being welded thereto as shown at 28 in Fig. 3. Note that in Fig. 5 the new form of digger 15a is shown in fragmental rear elevation as indicated by the line 5—5 of Fig. 1. Then Fig. 6 shows a sectional view along the line 6—6 of Fig. 5. It is seen from Fig. 5 and 6 that digger 15a is cast with a longitudinal groove 21a sunk into its rear surface 21 and that spaced along groove 21a are a number of integral strips 27a extending inwardly into groove 21a from the wall thereof and continuing outwardly beyond the surface 15 to form end tabs 27b between which metal conduit 24 is laid. Fig. 7 shows how end tabs 27b are bent around conduit 24 to hold it securely in place on digger 15 but spaced therefrom in groove 21a by the strip 27a cast integral with digger 15.

Having thus listed some of the objects of my invention, illustrated and described two forms in which my invention may be practical and explained its operation, I claim:

1. A spring tooth for a soil cultivator to be used for applying a fluid fertilizer to the subsoil through which the digger end of said tooth is moved, said spring tooth including an applicator for applying said fertilizer to the subsoil, a digger for protectively supporting said applicator while moving said applicator through said subsoil and a resilient spring member for supporting said digger on said cultivator; said spring member having an upper end formed with means for securing said spring at a desired location on said cultivator and a lower end in the form of a concavely forwardly curved round bar; said digger comprising a metal blade forwardly concavely curved with its fore and aft vertical center line in the fore and aft vertical center plane of said spring member, the upper end of said blade having a socket sunk therein along the center line of said spring to receive the lower end of said spring coaxially therein, sections through said blade normal to its center line being substantially triangular therealong with the apices of said sections in a concavely forwardly curved line ahead of said center line in said center plane, the upper end of the rear surface of said blade having a vertical slot sunk forwardly therein to intercept said socket, the rear surface of said blade below said slot being rearwardly convexly bowed from below said slot to a vertically downwardly extension near its lower end, said rear surface including means formed therealong for securing said applicator therealong spaced therefrom; said applicator including a hollow tube having a closed end positioned behind said downward extension of said blade and oppositely directed side wall perforations above the end thereof; said blade having associated therewith means for laterally squeezing said blade at said slot to hold said blade on said spring, said blade being prevented from turning on said spring by the common axial curvature of said blade and said spring at said socket.

2. In combination a digger attachment and a spring element together forming a spring tooth for a spring tooth type of soil cultivator including means for applying a vaporous fertilizer to the soil through which the free end of said tooth is moved, said cultivator including a frame having a tool bar, said spring element including means at one end for securing said spring element to said tool bar, the other end of said spring element being in the form of a concavely forwardly curved round bar, said digger attachment comprising a metal blade generally forwardly concavely curved and formed at its upper end with an axial socket adapted closely to receive coaxially therewith said other end of said spring element whereby the identical forward curvatures of said socket and said mating coaxial other end of said spring element will prevent any rotation of said blade on said spring element, said means for applying a vaporous fertilizer to the soil including a conduit, a groove of greater width than said conduit sunk longitudinally along the rear side of said blade to receive said conduit to discharge said fertilizer from a hole near the lower end of said conduit near the lower end of said blade, said blade including means spaced along its rear side for securing said conduit in said groove and spaced from the wall of said groove.

References Cited in the file of this patent
UNITED STATES PATENTS

| | | |
|---|---|---|
| 474,461 | Ryder | May 10, 1892 |
| 493,071 | Crane | Mar. 7, 1893 |
| 1,934,490 | Elliott | Nov. 7, 1933 |
| 2,598,121 | Hannibal | May 27, 1952 |
| 2,684,617 | Johnston | July 27, 1954 |
| 2,781,733 | Graham | Feb. 19, 1957 |
| 2,804,034 | Hunter | Aug. 27, 1957 |
| 2,857,863 | Jessen | Oct. 28, 1958 |
| 2,874,656 | Bennett | Feb. 24, 1959 |

OTHER REFERENCES

Demster Liquijector (Publication), March 1, 1957, (publication of Demster Mill Mfg. Co., Beatrice, Nebraska).